United States Patent
Watanabe et al.

(10) Patent No.: US 6,236,896 B1
(45) Date of Patent: May 22, 2001

(54) COORDINATE SYSTEM SETTING METHOD USING VISUAL SENSOR

(75) Inventors: Atsushi Watanabe; Fumikazu Warashina, both of Oshino-mura (JP)

(73) Assignee: Fanuc Ltd., Yamanashi (JP)

(*) Notice: Subject to any disclaimer, the term of this patent is extended or adjusted under 35 U.S.C. 154(b) by 0 days.

(21) Appl. No.: 09/004,506

(22) Filed: Jan. 8, 1998

Related U.S. Application Data

(63) Continuation of application No. 08/440,343, filed on May 12, 1995, now abandoned.

(30) Foreign Application Priority Data

May 19, 1994 (JP) .................................................. 6-128005

(51) Int. Cl.[7] ...................................................... G05B 13/02
(52) U.S. Cl. ............................ 700/37; 700/192; 700/59; 700/61; 700/252; 700/258; 700/259; 414/730; 701/1
(58) Field of Search .................... 700/5, 31, 115, 700/188, 192, 246, 248, 249, 252, 258, 259, 262, 166, 254, 59, 61, 66, 279, 62, 56, 302, 251, 87; 414/730; 701/1; 348/95

(56) References Cited

U.S. PATENT DOCUMENTS

| | | |
|---|---|---|
| 4,611,292 | 9/1986 | Ninimiya et al. ................. 702/153 |
| 4,630,225 | 12/1986 | Hisano ................................ 702/153 |
| 4,712,970 | 12/1987 | Nakamura et al. ................. 414/730 |
| 4,755,949 | 7/1988 | Shiratori et al. .................... 700/192 |
| 4,837,487 * | 6/1989 | Kurakake et al. ............... 318/568.16 |
| 4,920,500 | 4/1990 | Hetland et al. ..................... 700/251 |
| 4,942,539 | 7/1990 | McGee et al. ...................... 700/194 |
| 4,945,493 | 7/1990 | Huang et al. ....................... 514/195 |
| 4,954,762 | 9/1990 | Miyakee et al. ................ 318/568.19 |
| 4,969,108 | 11/1990 | Webb et al. ......................... 700/259 |
| 5,066,902 * | 11/1991 | Watanabe ........................ 318/568.16 |
| 5,220,510 | 6/1993 | Araki ................................ 364/474.36 |
| 5,297,238 | 3/1994 | Wang et al. .......................... 250/307 |
| 5,305,427 | 4/1994 | Nagata ................................. 700/259 |
| 5,319,443 | 6/1994 | Watanabe et al. .................... 356/375 |

(List continued on next page.)

FOREIGN PATENT DOCUMENTS 4-75887  3/1992  (JP) .

OTHER PUBLICATIONS

Canata et al., "Active Eye–Head Control", IEEE., pp., 2837–2843., vol. 4, 1994.*
Ishii et al., "A Calibration Procedure For A Hand Eye System", IEEE., pp., 655–660 vol. 1, 1991.*

Primary Examiner—William Grant
Assistant Examiner—McDieunel Marc
(74) Attorney, Agent, or Firm—Staas & Halsey LLP

(57) ABSTRACT

A method of setting a coordinate system to an automatic machine with a stable accuracy in a non-contact manner. The desired coordinate system can be set even if it exists outside a moving range of the automatic machine. The operator operates a robot control device to move a robot to a first position A1 where a coordinate system setting jig is within the field of view of a camera supported by the robot. Matrix data [A1] representing the robot position A1 is stored and the jig is photographed by the camera. The image of a group of dots on the jig are analyzed by an image processor to obtain picture element values of the individual points. Based on the picture element values of the individual points and jig data (data of distances between and number of the points), matrix data [D1] representing a position and a posture of a coordinate system $\Sigma c$ to be set with respect to a sensor coordinate system $\Sigma s$ is obtained. In the same manner, a matrix data [D2] at a position A2 is obtained. According to a relationship $[C]=[A1]\cdot[S]\cdot[D1]=[A2]\cdot[S]\cdot[D2]$, a matrix [C] is derived and stored as data for setting the coordinate system $\Sigma c$ to the robot control device.

8 Claims, 3 Drawing Sheets

U.S. PATENT DOCUMENTS

| | | | |
|---|---|---|---|
| 5,329,469 | * 7/1994 | Watanabe | 700/259 |
| 5,333,242 | 7/1994 | Watanabe et al. | 700/254 |
| 5,350,269 | * 9/1994 | Azuma et al. | 414/416 |
| 5,412,759 | 5/1995 | Yano et al. | 700/248 |
| 5,444,245 | 8/1995 | Kitamura | 700/253 |
| 5,495,090 | 2/1996 | Mukai et al. | 219/124.34 |
| 5,570,190 | * 10/1996 | Terawaki et al. | 356/400 |
| 5,727,132 | * 3/1998 | Arimatsu et al. | 700/259 |

* cited by examiner

COORDINATE SYSTEM SETTING METHOD USING VISUAL SENSOR

This application is a Continuation of application No. 08/440,343, filed on May 12, 1995 now abandoned.

BACKGROUND OF THE INVENTION

1. Field of the Invention

This invention relates to a method for setting a coordinate system to an automatic machine such as a robot, and more particularly, to a coordinate system setting method in a non-contact way using a visual sensor and coordinate system expressing means.

2. Description of the Related Art

In an automatic machine, such as a machine tool and a robot, having a movable part which moves along a predetermined path according to a robot movement program, a plurality of coordinate systems are set, and an appropriate coordinate system for the movement is selected in accordance with the type of operation. Data representing a position and a posture of the movable part and thus representing a position of the automatic machine is hereinafter referred to as "position data".

In the automatic machine, a reference coordinate system (base coordinate system) is fixedly set, and the setting of other coordinate systems is accomplished by determining transfer matrix data representing positions and postures of the other coordinate systems with respect to the reference coordinate system.

Conventionally, in setting a new coordinate system by the foregoing way, a jig having a plurality of fixed points which represent a coordinate system is disposed in a desired position, and a specific point on the movable part of the automatic machine is successively brought into touch with the individual fixed points on the jig. The translation matrix data is obtained based on the data of geometric positions of the respective fixed points on the jig and the position data of the automatic machine each time the movable part is in touch with each fixed point.

For example, a point (0, 0, 0) is selected as a first point to represent the original point of a coordinate system to be set; a point (x0, 0, 0); x0≠0 is selected as a second point to represent the direction of the X axis; a point (0, y0, 0); y0≠0 on the Y axis is selected as a third point to represent the direction of an X-Y plane, from the plurality of points on the jig. Three pins are set at the respective three points, and then the specific point of the movable part is successively brought into direct touch with these pins by the manual operation (jog feed) of the automatic machine. Based on the position data of the automatic machine when the specific point touches the respective pins and data representing the geometric positions of the respective fixed points on the jig, the translation matrix data which represents a relative position and posture of the coordinate system represented by the jig with respect to the base coordinate system is obtained.

However, an extremely precise and delicate manual operation is required for accurately bringing the specific point on the movable part of the automatic machine into touch with a plurality of points on the jig, and therefore it is difficult to set a proper coordinate system in a short time. Further, a substantial error tends to occur due to, for example, the degree of experience of the operator. Furthermore, since it is necessary to actually bring the specific point into touch with the jig, there is a restriction that the automatic machine can not recognize any coordinate system existing out of the range of movement thereof.

SUMMARY OF THE INVENTION

It is an object of the present invention to provide a coordinate system setting method by which a coordinate system is set with stable precision to an automatic machine such as a robot, in a non-contact manner using a visual sensor and by a simple operation not requiring a highly experienced operator. Another object of the present invention is to set the desired coordinate system existing out of the range of movement of the automatic machine.

A coordinate system setting method according to the present invention comprises the steps of: disposing a coordinate system expressing means for visually expressing the coordinate system to be set in a desired position on a reference coordinate system set to the automatic machine; moving a movable part of the automatic machine to at least two different positions, said movable part supporting the camera; photographing the coordinate system expressing means by the camera at each of at least two positions and obtaining image data of the coordinate system expressing means; obtaining transformation data between a sensor coordinate system set to the visual sensor and the coordinate system to be set, based on the obtained image data and geometric data of the coordinate system expressing means; and obtaining data representing a position and a posture of the coordinate system to be set with respect to the reference coordinate system, based on the data representing the position and posture of the movable part of the automatic machine at least at the two positions and the obtained transformation data.

DETAILED DESCRIPTION OF THE PREFERRED EMBODIMENT

The present invention adopts a method of photographing the coordinate system expressing means for representing an aimed coordinate system by a visual sensor supported on an automatic machine, substituting for the conventional contact method for the automatic machine such as a robot. The principle of a coordinate setting method of the present invention will be described referring to FIG. 1, with respect to an example of a robot which is a typical automatic machine having a movable part to be moved along a predetermined path according to a movement program including position data.

Figure 1:
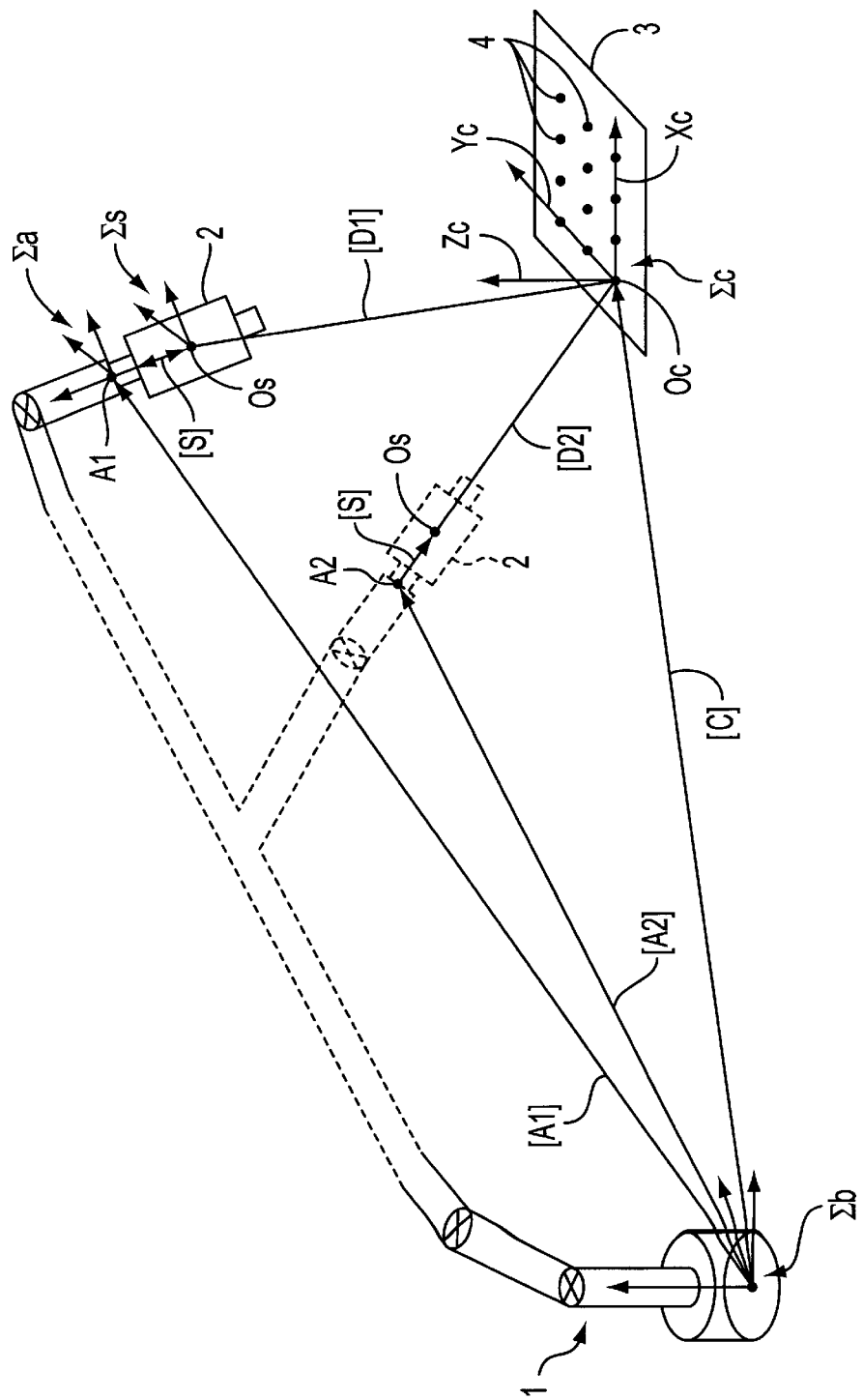
FIG. 1 is a diagram illustrating the principle of a coordinate system setting method of this invention.

In FIG. 1. a camera 2 serving as the visual sensor is supported on the distal end of an arm of a robot 1. For example, a video camera using a CCD element is adopted as the camera 2. A coordinate system setting jig 3 is means for expressing the coordinate system, which visually represents a position and posture of a coordinate system $\Sigma c$ (Oc-XcYcZc) to be set. The jig 3 has a plurality of dots 4 arranged in a matrix on a plane thereof. The dots 4 geometrically represent the original point Oc, the direction of the Xc axis and the direction of the plane Xc-Yc of the coordinate system $\Sigma c$ to be set. The Z axis extends in a direction of a normal vector of the Xc-Yc plane, i.e., the product of a unit vector in the direction of the Xc axis and a unit vector in the direction of the Yc axis.

The coordinate system expressing means need not be a jig with a group of dots and may be the one that can visually represent a position and posture of a coordinate system Σc to be set, e.g., a mark labeled on a floor or table and characteristic portions (such as ridgelines) of a workpiece placed in a predetermined position.

In contrast with the conventional method, there is no restriction that the coordinate system to be set (coordinate system expressing means) has to exist within the range of movement of the robot 1. The coordinate system can be set in such an arbitrary position that the coordinate system expressing means (jig) can be properly in the field of view of the camera 2 by moving the robot 1 to an appropriate position.

A base coordinate system Σb as a reference coordinate system is fixedly set to the robot 1 in a working space thereof, and a face plate coordinate system Σa is set to a face plate at the distal end of a robot arm. A sensor coordinate system Σs is set to a visual sensor including the camera 2 so as to represent the position of an object captured by the camera 2. The position and posture of the face plate coordinate system Σa in the base coordinate system Σb is hereinafter simply referred to "robot position".

The relationship between the individual coordinate systems Σb, Σa, Σs and Σc when the jig 3 is photographed by the camera 2 at the robot positions A1 and A2 will be considered in the following. Matrices (four-row, four-column homogeneous transformation matrices) representing the relationships between the individual coordinate systems are defined as follows:

[C]: a matrix which represents the position and posture of the coordinate system Σc with respect to the base coordinate system Σb. This matrix is an unknown matrix to be derived, by which the coordinate system Σc is set to the robot.

[A1]: a matrix which represents the position and posture of the face plate coordinate system Σa with respect to the base coordinate system Σb when the robot 1 is situated at the position A1. This matrix is recognized by the robot control device as the current robot position A1.

[A2]: a matrix which represents the position and posture of the face plate coordinate system Σa with respect to the base coordinate system Σb when the robot 1 is situated at the position A2. This matrix is recognized by the robot control device as the current robot position A2.

[S]: a matrix which represents the position and posture of the sensor coordinate system Σs with respect to the face plate coordinate system Σa.

[D1]: a matrix which represents the position and posture of the coordinate system Σc with respect to the sensor coordinate system Σs when the robot 1 is situated at the position A1. This matrix can be calculated based on image data of the dots 4 captured by the camera 2 at the robot position A1 and data representing the positions of the dots 4 on the jig 3.

[D2]: a matrix which represents the position and posture of the coordinate system Σc with respect to the sensor coordinate system Σs when the robot 1 is situated at the position A2. This matrix can be calculated based on image data of the dots 4 captured by the camera 2 at the robot position A2 and data representing the positions of the dots 4 on the jig 3.

Using the above-defined matrices, the following equations are established:

$$[C]=[A1][S][D1] \quad (1)$$

$$[C]=[A2][S][D2] \quad (2)$$

From the equations (1) and (2), the following equations are obtained.

$$[A1][S][D1]=[A2][S][D2] \quad (3)$$

$$[A1]^{-1}[C][D1]^{-1}=[A2]^{-1}[C][D2]^{-1} \quad (4)$$

As is mentioned above, the matrices [A1] and [A2] are known data which are recognized as the current position data when the robot 1 is situated at the respective positions A1 and A2. The matrices [D1] and [D2] are the data which represent the position and posture of the coordinate system Σc with respect to the sensor coordinate system Σs at the robot positions A1 and A2, respectively. At each position A1, A2, the characteristic portion on the jig 3 (a group of dots 4 in this embodiment; this may be represented by lines) is photographed by the camera 2, and each matrix [D1], [D2] is calculated based on the captured image data and the geometrical data of the dots 4 on the jig 3, such as distances and number of the dots 4.

Therefore, the matrix [C] can be derived from the equation (4) by obtaining the matrices [D1] and [D2] at at least two different positions A1 and A2.

The calculation for obtaining the matrices [D1] and [D2] based on the image data captured by the camera 2 and the data representing the position of the group of the dots 4 on the jig 3 is generally called "calibration" of the camera, for which various kinds of methods are known in the art. Any known method of calibration may be adopted in the present invention. For example, calibration data may be obtained using picture element values of some dots selected from a group of dots. Principally, it is necessary to observe at least three dots for obtaining the calibration data. It is pointed out, however, that at least seven points are necessary to be observed when giving consideration to the distortion of a camera lens by the Tsai model. The document describing the detail of calibration of camera is exemplified by "An efficient and accurate camera calibration technique for 3rd machine vision", Roger Y. Tsai, Proc. Computer Vision and Pattern Recognition '86, pp. 364–374, 1986.

The camera 2 and an image processing device 10 connected to the camera 2 for use in carrying out the present invention will be described with reference to FIG. 2.

Figure 2:
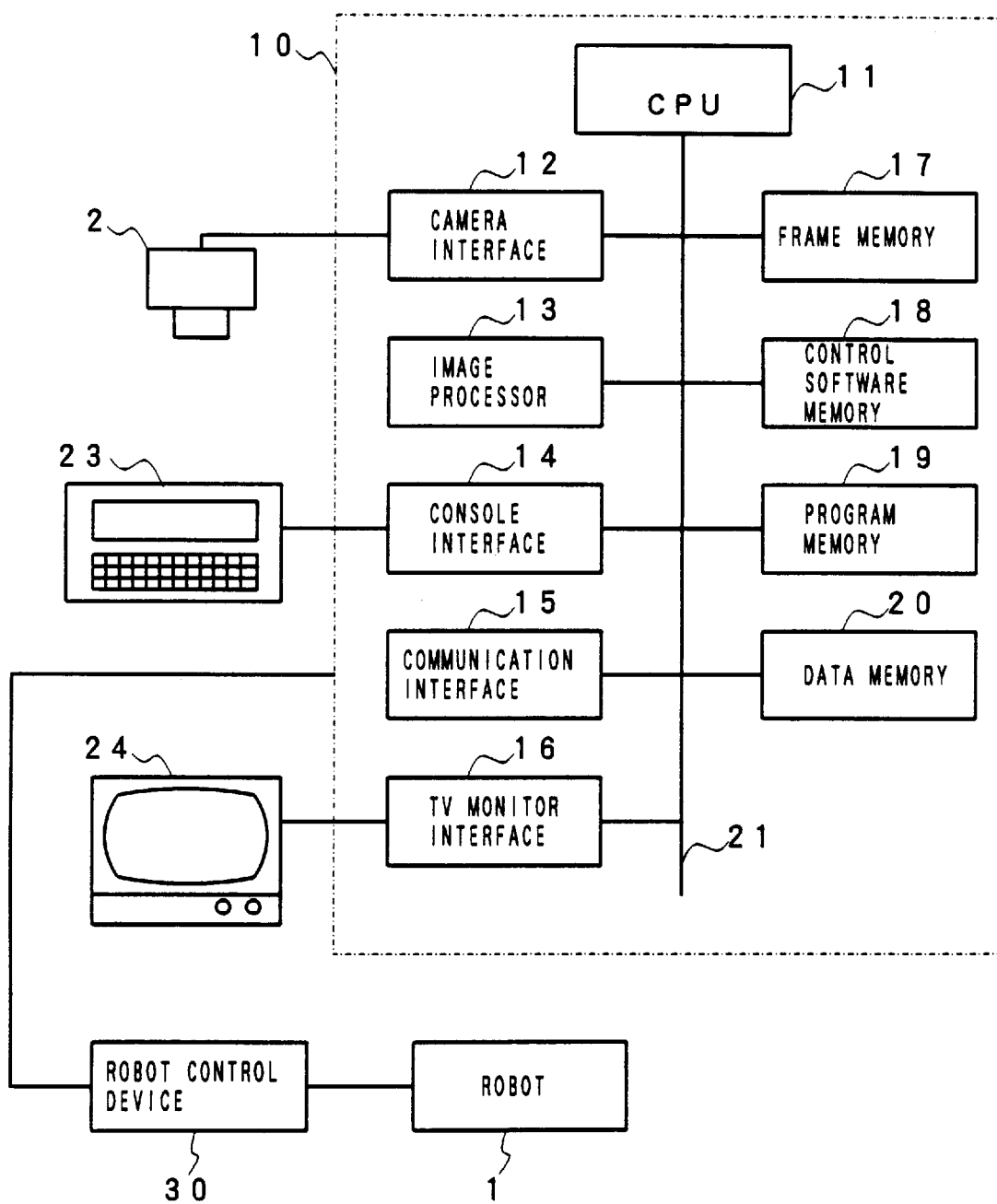
FIG. 2 is a block diagram showing a visual sensor and a principal part of an image processing device for carrying out the invention.

In FIG. 2, the image processor 10 has a central processing unit (CPU) 11, to which a camera interface 12, an image processor 13, a console interface 14, a communication interface 15, a TV monitor interface 16, a frame memory 17, a control software memory 18 of ROM, a program memory 19 of RAM, and a data memory 20 of non-volatile RAM are connected via a bus 21. The camera 2 is connected to the camera interface 12.

The camera 2 connected to the image processor 10 is used for detecting the position of an object of operation (e.g., workpiece) so that the data for correcting the robot position is transmitted to the robot control device 30 connected with the communication interface 15 after completing the setting of the coordinate system Σc.

Although only one camera 2 is shown in FIG. 2, a plurality of cameras can be simultaneously connected to the communication interface 15 as needed. In this case, the sensor coordinate system Σs is respectively set in each camera.

The image captured by the camera 2 is converted into a light-and-shade image by a gray scale, and the converted image data is stored in the frame memory 17. The image processor 13 processes the image data stored in the frame memory 17 to recognize the image of the characteristic points of the jig 3 and determines the position of the characteristic points (the corresponding image element value or a central image element value if the image is expanded).

A console 23 connected to the console interface 14 has a liquid crystal display, various kinds of instruction keys and numeral keys, for performing inputting, editing, registering and execution of an application program. A menu for setting various kinds of data, a list of programs, etc., are displayed on the liquid crystal display.

A control program for the CPU 11 to control the visual sensor system is stored in the control software memory 18 and a program created by the user is stored in the program memory 19.

The communication interface 15 is connected with the robot control device 30 for controlling an automatic machine (robot) 1 utilizing the position information of a workpiece detected by the visual sensor. A TV monitor 24 is connected with the TV monitor interface 16 so as to selectively display an image being photographed by the camera 2 or an image stored in the frame memory 17.

Figure 3:
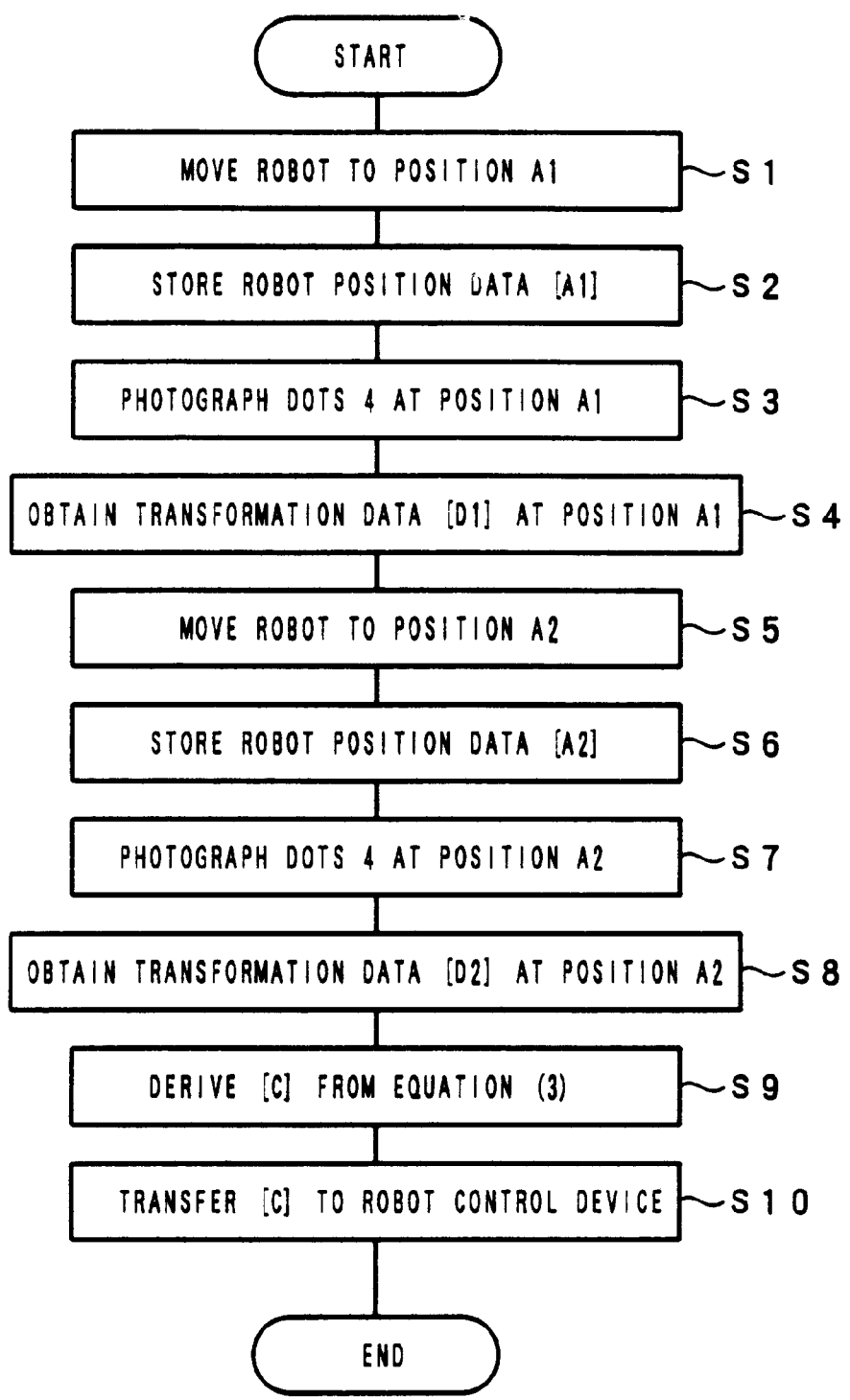
FIG. 3 is a flowchart showing the operation and processing procedure for setting a coordinate system according to the invention.

The arrangement of the above-described visual sensor system is similar to that of the conventional visual sensor system except that jig data (i.e., the data of mutual distance and number of dots on the jig 3) and programs necessary for executing the proceedings shown in the flowchart of FIG. 3 are stored in the control software memory 18 or the data memory 20. Assuming that the preparatory operation such as setting of the camera and input of the jig data has been completed, the operation and processing for setting the coordinate system Σc will be described.

First, the operator operates the robot control device 30 to move the robot 1 to the first position A1 so that the jig 3 is within a field of view of the camera 2 (Step S1). The matrix data [A1] representing the position A1 is transferred from the robot control device 30 to the data memory 20 for storage (Step S2).

Then, the jig 3 is photographed by the camera 2 at the robot position A1 and the image of the dots 4 is taken in the frame memory 17 (Step S3). Upon completion of the photographing, the matrix data [D1] is obtained from image element values of the individual points 4 and the jig data (the data of distances and number of the dots 4) (Step S4). In the same manner, the dots 4 are photographed at the robot position A2 (Step S7) and the transformation data [D2] is obtained (Step S8).

The operator then operates the robot control device 30 to move the robot 1 to the second position A2 so that the jig 3 is within a field of view of the camera 2 (step S5). The matrix data [A2] representing the position A2 is transferred from the robot control device 30 to the data memory 20 for storage (step S6).

The jig is photographed by the camera 2 at the robot position A2 and the image of the dots 4 is taken in the frame memory 17 (step S7). Upon completion of the photographing, the matrix data [D2] is obtained from image element values of the individual points 4 and the jig data (the data of distances and number of the dots 4).

In the subsequent step S9, the matrix [C] is calculated according to the above-mentioned equation (4) using the data of matrices [A1], [A2], [D1] and [D2], and the result of calculation is transferred to the robot control device 30 (Step S10). The robot control device 30 stores the transferred data in a predetermined memory area as data for setting the aimed coordinate system, to terminate the processings.

At least part of the processings except the Steps S3 and S7 may be executed by the robot control device 30.

According to the present invention, a coordinate system is set with stable precision to an automatic machine such as a robot, in a non-contact manner using a visual sensor and by a simple operation not requiring a highly experienced operator. Also, the coordinate system out of the range of movement of the automatic machine can be set to the machine so that the coordinate system is recognized by the machine controller.

What is claimed is:

1. A method of setting a coordinate system to an automatic machine using a visual sensor including a camera, said method comprising:

disposing coordinate system expressing means for visually expressing the coordinate system to be set in a desired position on a reference coordinate system set to said automatic machine;

moving a movable part of said automatic machine to at least two different positions, said movable part supporting said camera;

photographing said coordinate system expressing means by said camera at each of said at least two positions and obtaining image data of said coordinate system expressing means;

obtaining transformation data between a sensor coordinate system set to said visual sensor and the coordinate system to be set, based on the image data obtained in said photographing and geometric data of said coordinate system expressing means; and obtaining data representing a position and a posture of the coordinate system to be set with respect to said reference coordinate system, based on the data representing the position and posture of said movable part of said automatic machine at said at least two positions, and said transformation data obtained in said obtaining transformation data.

2. A coordinate system setting method according to claim 1, wherein said coordinate system expressing means comprises a jig having a group of dots arranged on a plane thereof for representing three axes of the coordinate system to be set.

3. A coordinate system setting method according to claim 1, wherein said coordinate system expressing means comprises characteristic portions of a workpiece and a mark placed in predetermined positions.

4. A method of setting a coordinate system to an automatic machine using a visual sensor, said method comprising the:

placing a coordinate system marker for visually expressing the coordinate system to be set in a predetermined position on a reference coordinate system set to said automatic machine;

moving a movable part of said automatic machine, which supports said visual sensor, to a first position and photographing said coordinate system marker to obtain first image data;

moving said movable part to a second position and photographing said coordinate system marker to obtain second image data; and determining transformation data between a sensor coordinate system set to said visual sensor and said coordinate system to be set, based upon said first and second image data and predetermined data regarding said coordinate system marker.

5. A method as claimed in claim 4, further comprising the obtaining data representing a position and a posture of the coordinate system to be set, based upon data representing the position and posture of said movable part at said first and second positions and said transformation data.

6. A method of setting a coordinate system to an automatic machine using a visual sensor, said method comprising the:

placing a coordinate system marker for visually expressing the coordinate system to be set in a predetermined position on a reference coordinate system set to said automatic machine;

moving a movable part of said automatic machine, which supports said visual sensor, to a first position and photographing said coordinate system marker to obtain first image data;

moving said movable part to a second position and photographing said coordinate system marker to obtain second image data;

determining transformation data between a sensor coordinate system set to said visual sensor and said coordinate system to be set, based upon said first and second image data and predetermined data regarding a specific position and geometric configuration of said coordinate system marker; and obtaining data representing a position and a posture of the coordinate system to be set, based upon data representing the position and posture of said movable part at said first and second positions and said transformation data.

7. A method of setting a coordinate system to an automatic machine using a visual sensor including a camera, said method comprising the:

disposing coordinate system expressing means for visually expressing the coordinate system to be set in a desired position and which is out of range of movement of said automatic machine on a reference coordinate system set to said automatic machine;

moving a movable part of said automatic machine to at least two different positions, said movable part supporting said camera;

photographing said coordinate system expressing means by said camera at each of said at least two positions and obtaining image data of said coordinate system expressing means;

obtaining transformation data between a sensor coordinate system set to said visual sensor and the coordinate system to be set, based on the image data obtained in said photographing and geometric data of said coordinate system expressing means; and obtaining data representing a position and a posture of the coordinate system to be set with respect to said reference coordinate system, based on the data representing the position and posture of said movable part of said automatic machine at said at least two positions, and said transformation data obtained in said obtaining transformation data.

8. A method of setting a coordinate system to an automatic machine using a visual sensor, said method comprising the:

placing a coordinate system marker for visually expressing the coordinate system to be set in a predetermined position and which is out of range of movement of said automatic machine on a reference coordinate system set to said automatic machine;

moving a movable part of said automatic machine, which supports said visual sensor, to a first position and photographing said coordinate system marker to obtain first image data;

moving said movable part to a second position and photographing said coordinate system marker to obtain second image data; and determining transformation data between a sensor coordinate system set to said visual sensor and said coordinate system to be set, based upon said first and second image data and predetermined data regarding said coordinate system marker.

* * * * *

UNITED STATES PATENT AND TRADEMARK OFFICE
CERTIFICATE OF CORRECTION

PATENT NO. : 6,236,896 B1
DATED : May 22, 2001
INVENTOR(S) : Atsushi Watanabe et al.

It is certified that error appears in the above-identified patent and that said Letters Patent is hereby corrected as shown below:

Column 6,
Line 51, delete "the".

Column 7,
Line 7, delete "the";
Line 32, delete "the".

Column 8,
Line 20, delete "the".

Signed and Sealed this

Eighth Day of January, 2002

Attest:

JAMES E. ROGAN
*Director of the United States Patent and Trademark Office*

*Attesting Officer*